United States Patent
Sato et al.

(10) Patent No.: US 7,726,360 B2
(45) Date of Patent: *Jun. 1, 2010

(54) FUEL SUPPLY STATION INFORMATION DISTRIBUTING SYSTEM, FUEL SUPPLY STATION INFORMATION DISTRIBUTING SERVER, AND FUEL SUPPLY STATION INFORMATION DISPLAYING DEVICE

(75) Inventors: Kazuhisa Sato, Saitama (JP); Masanori Hayashi, Saitama (JP); Toshiaki Takeshita, Saitama (JP); Hiroyuki Abe, Saitama (JP); Hisashi Nagaoka, Saitama (JP); Junichi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1135 days.

This patent is subject to a terminal disclaimer.

(21) Appl. No.: 11/361,459

(22) Filed: Feb. 23, 2006

(65) Prior Publication Data
US 2006/0185756 A1 Aug. 24, 2006

(30) Foreign Application Priority Data
Feb. 23, 2005 (JP) .............................. 2005-047459

(51) Int. Cl.
*B65B 1/30* (2006.01)
*G06F 19/00* (2006.01)
*G06F 17/00* (2006.01)

(52) U.S. Cl. .......................... 141/94; 141/231; 701/123; 700/232; 700/236

(58) Field of Classification Search ................... 141/83, 141/94, 95, 98, 231; 701/29, 123, 213; 700/232, 700/272; 340/988, 450.2
See application file for complete search history.

(56) References Cited

U.S. PATENT DOCUMENTS

| | | | | |
|---|---|---|---|---|
| 5,790,973 A | * | 8/1998 | Blaker et al. | 455/456.5 |
| 6,078,850 A | * | 6/2000 | Kane et al. | 701/29 |
| 6,459,967 B1 | * | 10/2002 | Otto | 701/29 |
| 6,484,088 B1 | * | 11/2002 | Reimer | 701/123 |
| 6,691,025 B2 | * | 2/2004 | Reimer | 701/123 |
| 7,066,216 B2 | * | 6/2006 | Sato et al. | 141/94 |
| 7,181,337 B2 | * | 2/2007 | Kosaka | 701/110 |

FOREIGN PATENT DOCUMENTS

| | | |
|---|---|---|
| JP | 07-320197 | 12/1995 |
| JP | 2002-139334 | 5/2002 |
| JP | 2002-216296 | 8/2002 |

* cited by examiner

*Primary Examiner*—Timothy L Maust
(74) *Attorney, Agent, or Firm*—Fish & Richardson P.C.

(57) ABSTRACT

Fuel supply station information distributing system includes at least one vehicle, an information distributing server and at least one station, which are interconnected through communication line networks. The information distributing server transmits at every given time a request-to-send for vehicle information to the vehicles as well as a request-to-send for station information to the stations. The information distributing server then creates a fuel supply station information associating for each vehicle based on the vehicle information received from the vehicle and the station information received from the stations, and distributes it to the vehicle. When the vehicle receives the fuel supply station information from the information distributing server, it is displayed on the car navigation screen for notifying the driver.

5 Claims, 9 Drawing Sheets

FUEL SUPPLY STATION INFORMATION DISTRIBUTING SYSTEM, FUEL SUPPLY STATION INFORMATION DISTRIBUTING SERVER, AND FUEL SUPPLY STATION INFORMATION DISPLAYING DEVICE

CROSS REFERENCE TO RELATED APPLICATIONS

This application claims the foreign priority benefit under Title 35, United States Code, §119(a)-(d) of Japanese Patent Application No. 2005-047459, filed on Feb. 23, 2005 in the Japan Patent Office, the disclosure of which is herein incorporated by reference in its entirety.

BACKGROUND OF THE INVENTION

The present invention relates to a distributing system, a distributing server, and a displaying device for informing the driver of information about supply capacities of fuel supply stations.

Conventionally, a car navigation terminal boarded on a vehicle as one example of a movable member has been used to display information about fuel supply stations such as gas stations. For example, Japanese Laid-open Patent Application No. Hei-7-320197 (see paragraphs [0012] to [0015] and FIG. 2) discloses a car navigation system in which an onboard display monitor can display necessary information including geographical positions of gas stations and sales information of each gas station, and general information including traffic jam information and tourism information around the gas stations.

In terms of supply of gasoline, the number and the scale of infrastructures are sufficient with few restrictions, so that information provided for the infrastructure can be applied for the practical use even if such information merely includes geographical positions of gas stations. However, supply of hydrogen gas for a fuel cell vehicle is not sufficient in terms of infrastructure, and therefore at least until the infrastructure of fuel supply stations is well-developed, it is necessary to accurately identify the amount of fuel storage at each fuel supply station and the necessary amount of fuel consumption required for the vehicle to move to the fuel supply station, and to inform them to the driver.

According to the conventional car navigation system, it is possible to obtain information about geographical positions of fuel supply stations (gas stations) and other information around the fuel supply stations. However, the conventional car navigation system can not identify the amount of fuel storage at the fuel supply station when the vehicle arrives at the fuel supply station and the necessary amount of fuel consumption required for the vehicle to move to the fuel supply station. In this regard, because of the amount of fuel storage at the fuel supply station and reservations from other vehicles, there may be a problem such that the fuel supply station does not have a sufficient amount of fuel storage to be filled in the vehicle when the vehicle arrives at the fuel supply station.

In view of the above, it is an aspect of the present invention to provide systems, servers, and displaying devices for identifying and informing the driver of the amount of fuel storage at each fuel supply station when the movable member such as a vehicle arrives at the fuel supply station, so that the driver can arbitrarily and appropriately choose a fuel supply station.

Illustrative, non-limiting embodiments of the present invention overcome the above disadvantage and other disadvantages not described above.

SUMMARY OF THE INVENTION

It is an aspect of the present invention to provide a fuel supply station information distributing system comprising: at least one movable member side device, each mounted on a movable member, keeping movable member information that is information about the movable member, and updating the movable member information as needed; at least one fuel supply station side device, each installed in a fuel supply station for supplying movable members with fuel, keeping station information that is information about the fuel supply station, and updating the station information as needed; and a fuel supply station information distributing server connected to the movable member side devices and the fuel supply station side devices through a network, creating fuel supply station information associated with each of the movable members based on the movable member information received from one movable member side device and the station information received from the fuel supply station side devices, and distributing the fuel supply station information thus created to the one movable member side device. The movable member information includes a remaining amount of fuel of the movable member and a geographical position of the movable member, and the station information includes an amount of fuel storage at the fuel supply station and a geographical position of the fuel supply station. The fuel supply station information distributing server calculates for each movable member a prospective remaining amount of fuel when the movable member arrives at the fuel supply station, based on information including the remaining amount of fuel of the movable member, the geographical position of the movable member and the geographical position of the fuel supply station, creates the fuel supply station information about an amount of fuel that can be supplied at the fuel supply station to the movable member in consideration of the amount of fuel storage at the fuel supply station and the prospective remaining amount of fuel when the movable member arrives at the fuel supply station, and distributes the fuel supply station information thus created to the movable member side device. The movable member side device is connected to a display device for displaying predetermined information, and causes the display device to display the fuel supply station information upon receiving the fuel supply station information from the fuel supply station information distributing server.

According to the present invention, the driver of the movable member can recognize in advance the amount of fuel that can be supplied at the fuel supply station when the movable member arrives at the fuel supply station, through the display device of the movable member on which the fuel supply station information is displayed. Therefore, the driver can readily select an appropriate fuel supply station, and there is no need to stop at several fuel supply stations or to look around a fuel supply station.

It is another aspect of the present invention to provide a fuel supply station information distributing server which is connected to at least one movable member side device and at least one fuel supply station side device through a network, creates fuel supply station information associated with each of the movable members based on movable member information received from one movable member side device and station information received from the fuel supply station side devices, and distributes the fuel supply station information thus created to the one movable member side device. Each of the movable member side devices is mounted on a movable member, keeps the movable member information that is information about the movable member, and updates the movable member information as needed; and the movable member information includes a remaining amount of fuel of the movable member and a geographical position of the movable member. Each of the fuel supply station side devices is installed in a fuel supply station for supplying movable members with fuel, keeps the station information that is information about the fuel supply station, and updates the station information as needed; and the station information includes an amount of fuel storage at the fuel supply station and a geographical position of the fuel supply station. The fuel supply station information distributing server calculates for each movable member a prospective remaining amount of fuel when the movable member arrives at the fuel supply station, based on information including the remaining amount of fuel of the movable member, the geographical position of the movable member and the geographical position of the fuel supply station, creates the fuel supply station information about an amount of fuel that can be supplied at the fuel supply station to the movable member in consideration of the amount of fuel storage at the fuel supply station and the prospective remaining amount of fuel when the movable member arrives at the fuel supply station, and distributes the fuel supply station information thus created to the movable member side device.

Further, the aforementioned fuel supply station information distributing server may calculate for each of the movable members a prospective possible travel distance for which the movable member can move based on the information including the remaining amount of fuel of the movable member, calculate a station distance that is a distance from the movable member to an appropriate fuel supply station based on the geographical position of the movable member and the geographical position of the fuel supply station, create the fuel supply station information in order of movable members having smaller distance difference value that is a value obtained by subtracting the station distance from the prospective possible travel distance of the movable member, reserve the appropriate fuel supply station for supplying fuel to the movable member if the number of fuel supply stations that can offer fuel to the movable member is smaller than a predetermined number, and subtract an amount of fuel to be supplied to the movable member from the amount of fuel storage at the fuel supply station.

According to the present invention, the fuel supply station information distributing server creates the fuel supply station information in the order of priority from urgent movable members, and makes a reservation for the appropriate fuel supply station if necessary. Therefore, it is possible to prevent an emergency situation such as lack of fuel of the movable member. Further, a reservation for the fuel supply station is made by reflecting reservation situations of other movable members, so as to prevent an inconvenient situation such that the fuel supply station can not afford to supply fuel to the movable member when the movable member arrives at the fuel supply station.

It is another aspect of the present invention to provide a fuel supply station information displaying device connected to the movable member side device included in the aforementioned fuel supply station information distributing system. The fuel supply station information displaying device displays the fuel supply station information when the movable member side device receives the fuel supply station information from the fuel supply station information distributing server.

In the aforementioned fuel supply station information displaying device, a storage amount rate of fuel that is a rate of the amount of fuel storage at each fuel supply station to an amount of fuel required to fill up the movable member may be calculated as the fuel supply station information, and the fuel supply station information displaying device may display a display data indicating the calculated storage amount rate of fuel on a map data.

According to the present invention, the driver can readily recognize the rate of the amount of fuel storage at each fuel supply station to the amount of fuel required to fill up the movable member. Therefore, the driver can readily select an appropriate fuel supply station.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF EXEMPLARY EMBODIMENTS OF THE INVENTION

Exemplary embodiments for carrying out the present invention will be described below with reference to the drawings.

In a fuel supply station information distributing system according to one embodiment of the present invention, an information distributing server calculates for each movable member a fuel supply capacity of each fuel supply station at a time when the movable member arrives at the fuel supply station, based on information about the movable member and information about the fuel supply station, and distributes information about the fuel supply capacity (fuel supply station information) to the movable member. Each movable member receives the fuel supply station information and displays it on a display device.

System Configuration and Outline

Figure 1:
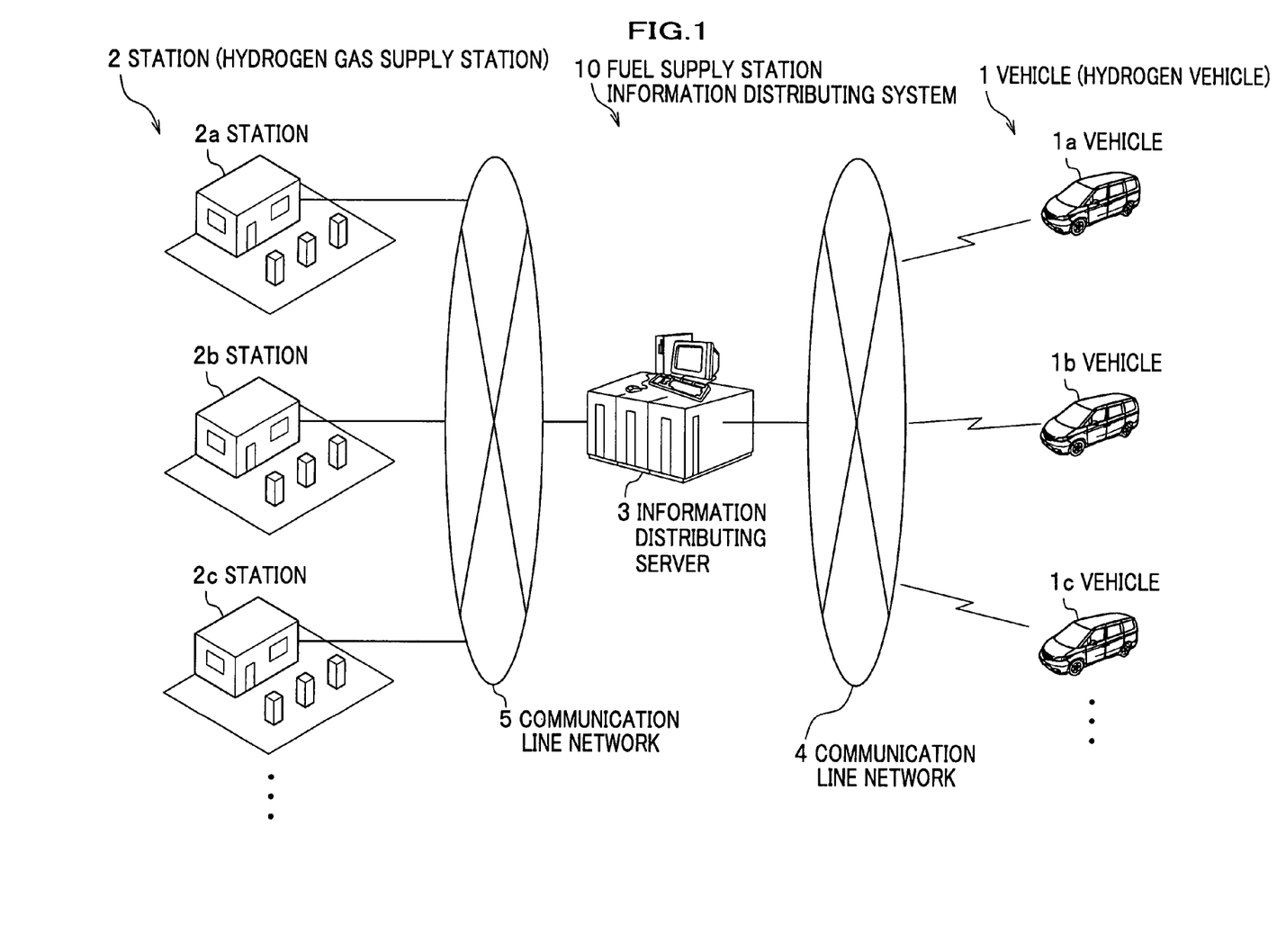
FIG. 1 is a block diagram illustrating a fuel supply station information distributing system according to one embodiment of the present invention.

As shown in FIG. 1, a fuel supply station information distributing system 10 includes at least one hydrogen vehicle (hereinafter simply referred to as a vehicle 1) as a movable member, an information distributing server 3 as a fuel supply station information distributing server, and at least one hydrogen gas supply station (hereinafter simply referred to as a station 2) as a fuel supply station, which stations 2 are interconnected to each other through a communication line network 4 and a communication line network 5. The communication line network 4 is established by a wireless network. The stations 2 and the information distributing server 3 are connected through the communication line network 5. The communication line network 5 is established either by a wired network or by a wireless network. Although the communication line networks 4, 5 are preferably dedicated lines, they can be public lines such as the Internet.

The vehicle 1 keeps vehicle information including a remaining amount of hydrogen gas of the vehicle 1 and a current geographical position of the vehicle 1, and constantly updates the vehicle information. When the vehicle 1 receives a request-to-send for the vehicle information from the information distributing server 3, the vehicle 1 sends the latest vehicle information to the information distributing server 3. When the vehicle 1 receives fuel supply station information from the information distributing server 3, the fuel supply station information is displayed on a car navigation screen (display device or fuel supply station information displaying device) and informed to the driver. These functions of the vehicle 1 can be realized by a computer device (movable member side device) mounted on the vehicle 1.

The station 2 is a hydrogen gas supply station. The station 2 keeps station information including the amount of hydrogen gas storage at the station 2 and a geographical position of the station 2, and constantly updates the station information. When the station 2 receives a request-to-send for the station information from the information distributing server 3, the station 2 sends the latest station information to the information distributing server 3. The station 2 accepts reservations about supply of hydrogen gas from the vehicles 1 or the information distributing server 3, and the reservation situations are reflected on the station information. These functions of the station 2 can be realized by a computer device (fuel supply station side device) installed in the station 2.

The vehicle(s) 1 and the station(s) 2 are general terms for indicating hydrogen vehicles and hydrogen gas supply stations, and when each hydrogen vehicle and each hydrogen gas supply station are denoted, an alphabetical subscript is given after each numerical number and shown as vehicle 1a, vehicle 1b, station 2a, station 2b, and the like.

The information distributing server 3 is a computer device which functions as a central control host in the fuel supply station information distributing system 10. The information distributing server 3 can be realized, for example, by a personal computer (PC) server. The information distributing server 3 continuously (at a predetermined time interval) sends a request-to-send for the vehicle information to the vehicles 1, and sends a request-to-send for the station information to the stations 2. The information distributing server 3 creates fuel supply station information associated with each of the vehicles 1 based on the vehicle information received from the vehicles 1 and the station information received from stations 2, and distributes the fuel supply station information thus created to each of the associated vehicles 1. As shown in FIG. 1, the information distributing server 3 may be installed at a position remote from the vehicles 1 and the stations 2. Alternatively, the information distributing server 3 may be installed in the vehicle 1 or the station 2. In the case where the information distributing server 3 is installed in the vehicle 1, the communication line network 5 is established by a wireless network.

Figure 2A:
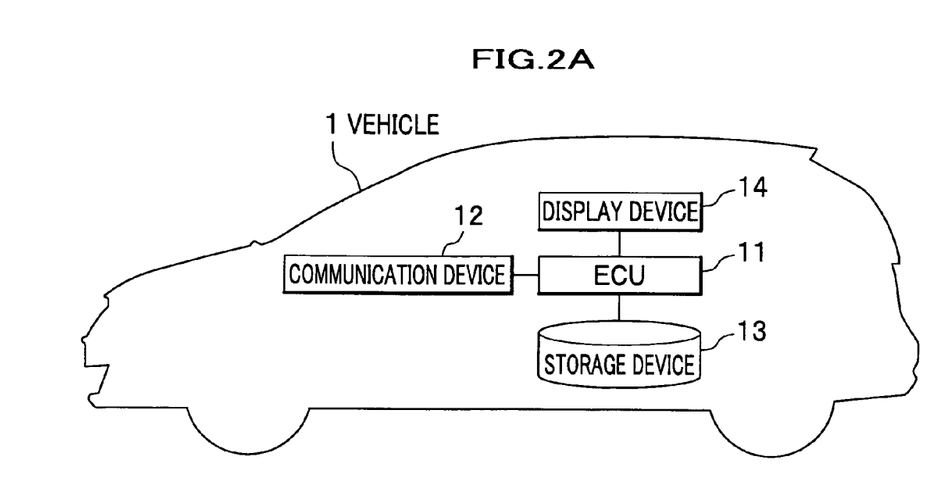
FIG. 2A shows a vehicle according to one embodiment of the present invention.

With reference to FIG. 2A and when necessary to FIG. 1, the construction of the vehicle 1 is explained. The vehicle 1 includes an ECU (Electronic Control Unit) 11 connected to a communication device 12, a storage device 13 and a display device 14. ECU 11 is a computer device for entirely controlling the vehicle 1, and especially in this embodiment, controls information transfer between the connected devices. The communication device 12 is a device for sending and receiving information between the information distributing server 3 and the ECU 11, and realized by a wireless network communication device or the like. The storage device 13 stores information received from the ECU 11. The storage device 13 is realized by a nonvolatile storage such as a hard disk device and a flash memory. The display device 14 displays information received from the ECU 11, and realized, for example, by a car navigation screen.

Figure 2B:
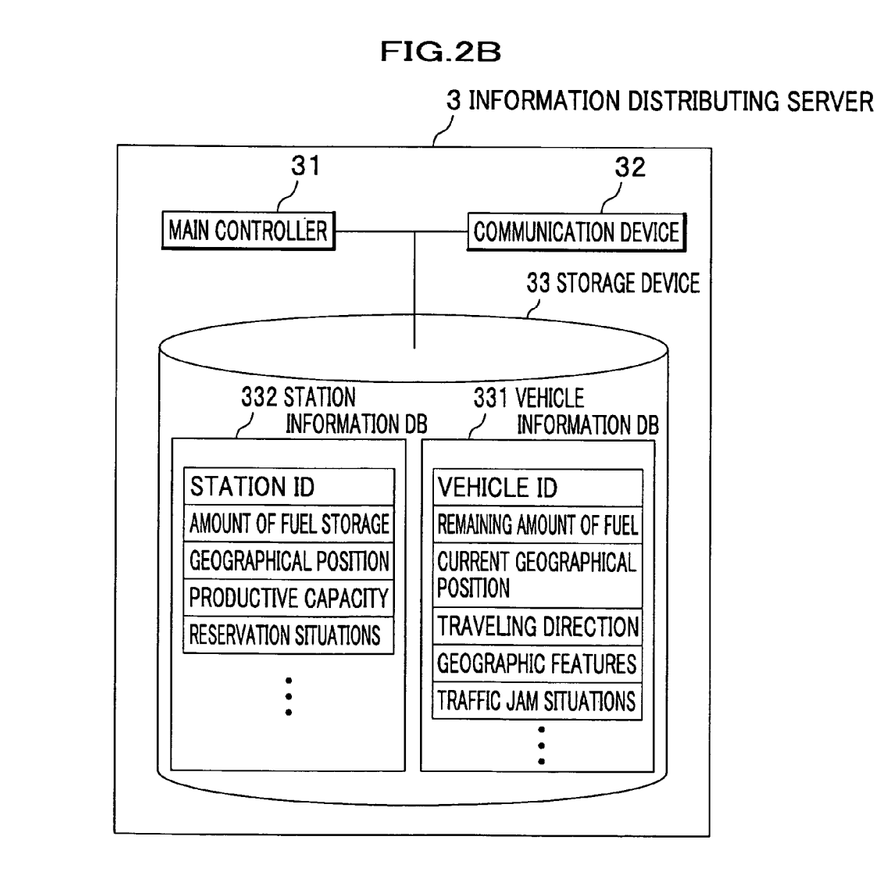
FIG. 2B shows an information distributing server according to one embodiment of the present invention.

With reference to FIG. 2B and when necessary to FIG. 1, the construction of the information distributing server is explained. The information distributing server 3 includes a main controller 31, a communication device 32 and a storage device 33. The main controller 31 functions to entirely control the information distributing server 3 (namely, realizes the information distributing server 3). The main controller 31 is equipped with a CPU (Central Processing Unit) and a memory. When the CPU executes a program stored in the predetermined memory, the functions of the information distributing server 3 is realized by the main controller 31. The communication device 32 is a device for performing a communication between the information distributing server 3 and the vehicles 1 and also for performing a communication between the information distributing server 3 and the stations 2. The communication device 32 is realized, for example, by a network access device. FIGS. 2A and 2B show only one communication device 32. However, two communication devices 32 may be employed, each of which associates with the communication line network 4 with the vehicles 1 and the communication line network 5 with the stations 2. The storage device 33 stores information that is necessary for the main controller 31 to function as the information distributing server 3. The storage device 33 is realized by a nonvolatile storage such as a hard disk device. The storage device 33 includes a vehicle information data base (DB) 331 and a station information data base (DB) 332.

The vehicle information data base 331 is a data base for storing vehicle information about vehicles 1. By the control of the main controller 31, the vehicle information is transmitted from a vehicle 1 to the vehicle information data base 331 through the communication line network 4 and the communication device 32, and stored in the vehicle information data base 331. The vehicle information includes a vehicle ID (identification) number, a remaining amount of fuel, a current geographical position, a traveling direction, geographic features and traffic jam situations. The vehicle ID is an identification number inherent in each vehicle 1. In this embodiment, the reference signs allocated to the vehicles 1 (1a, 1b, etc.) are used. The remaining amount of fuel indicates the amount of hydrogen gas that is currently remained in the vehicle 1. The current geographical position as a geographical position of the movable member indicates a geographical position where the vehicle 1 is currently located. The current geographical position may be the latitude and the longitude measured by GPS (Global Positioning System).

The traveling direction indicates a direction in which the vehicle 1 currently travels. The traveling direction is used as reference data for associating the vehicle 1 with the stations 2. For example, in an instance where appropriate stations 2 are selected for the vehicles 1 in order to determine a priority from urgent vehicles 1 for supplying fuel, not only distances between the vehicles 1 and the stations 2 but also stations 2 located near in the traveling direction are considered. The geographic features indicate road surface conditions of the road where the vehicle 1 is running. The geographic features include, for example, gradients in the front and rear directions of the vehicle 1. Therefore, it is possible to recognize whether the vehicle 1 is running on a flat road, an uphill road or a downhill road. The traffic jam situations indicate traffic conditions of the road where the vehicle 1 is running. The traffic jam situations include, for example, the speed of the vehicle 1 and the frequency of the brake pedal operation. It is possible to recognize the extent of the traffic jam based on the traffic jam situations. Taking into consideration the geographic features and the traffic jam situations, it is possible to estimate the fuel consumption at which the vehicle 1 is running. The vehicle information may include information such as destination and fuel consumption.

The station information data base 332 is a data base for storing station information about stations 2: By the control of the main controller 31, the station information is transmitted from a station 2 to the station information data base 332 through the communication line network 5 and the communication device 32, and stored in the station information data base 332. The station information includes a station ID, an amount of fuel storage, a geographical position, a productive capacity and reservation situations. The station ID is an identification number inherent in each station 2. In this embodiment, the reference signs allocated to the stations 2 (2a, 2b, etc.) are used. The amount of fuel storage indicates the amount of hydrogen gas currently stocked in the station 2. The geographical position as a geographical position of the fuel supply station indicates a geographical position where the station 2 is located. The geographical position may be the latitude and the longitude measured by GPS. The productive capacity indicates the amount of hydrogen gas for which the station 2 can produce per unit of time. The geographical position and the productive capacity are information inherent in each station 2, and they do not change frequently. Therefore, once the geographical position and the productive capacity are sent with the station ID from the station 2 to the information distributing server 3 and stored in the station information data base 332, as long as a change is not made on the geographical position and the productive capacity, the information distributing server 3 does not have to update them whenever receives the station information. Further, once the station 2 sends the station information, it is not necessary to resend the station information as long as a change is not made on the station information.

The reservation situations indicate situations about reservations for fuel supply at the station 2. The reservation situations include, for example, the vehicle ID of the reserved vehicle 1, the reserved amount of fuel supply and the reserved schedule (time). Reservations are made directly from the vehicles 1 or the information distributing server 3 to the stations 2. Reservations may be carried out through a communication between computer devices. Alternatively, the driver or passenger of the vehicle 1 may contact with a staff of the station 2 through a predetermined communication means such as mobile phone and E-mail, so that the staff updates the reservation situations of the supply station information that is kept in the computer device.

Process of System

Figure 3:
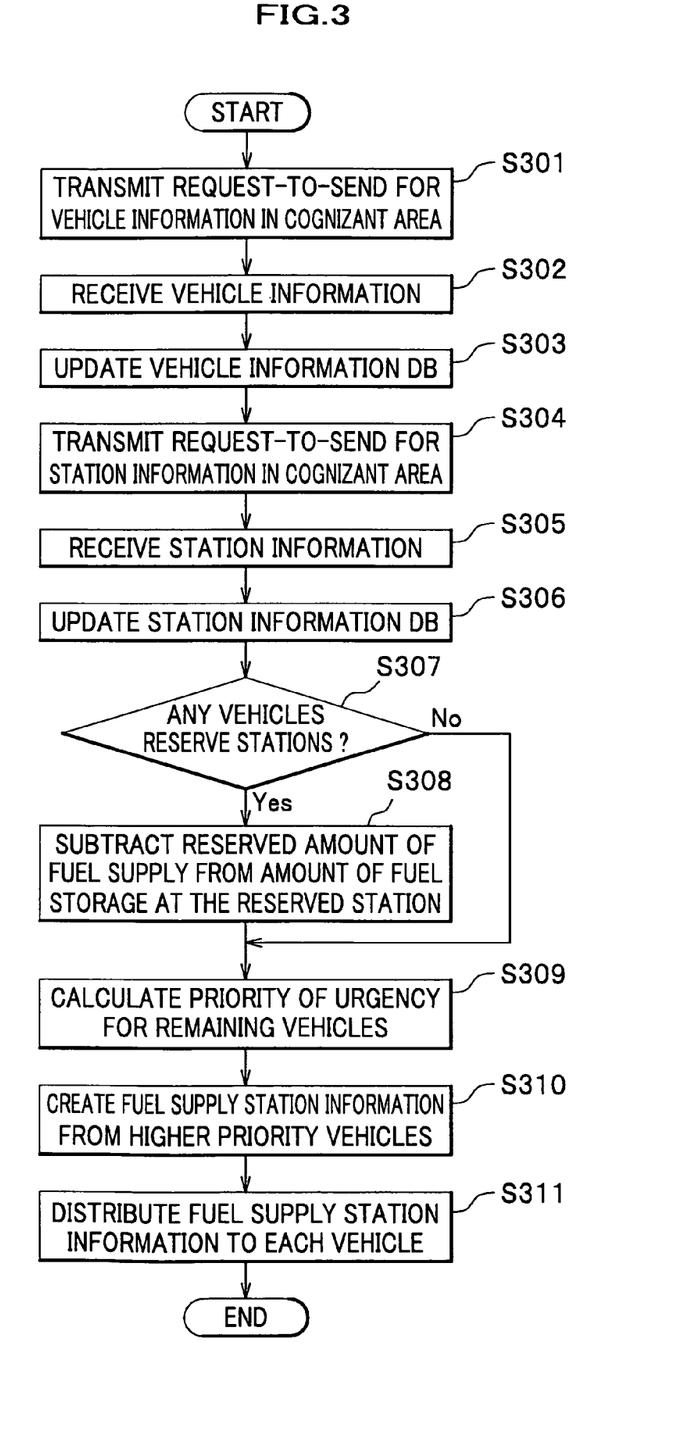
FIG. 3 is a flow chart showing main processes of the information distributing server.
Figure 4:
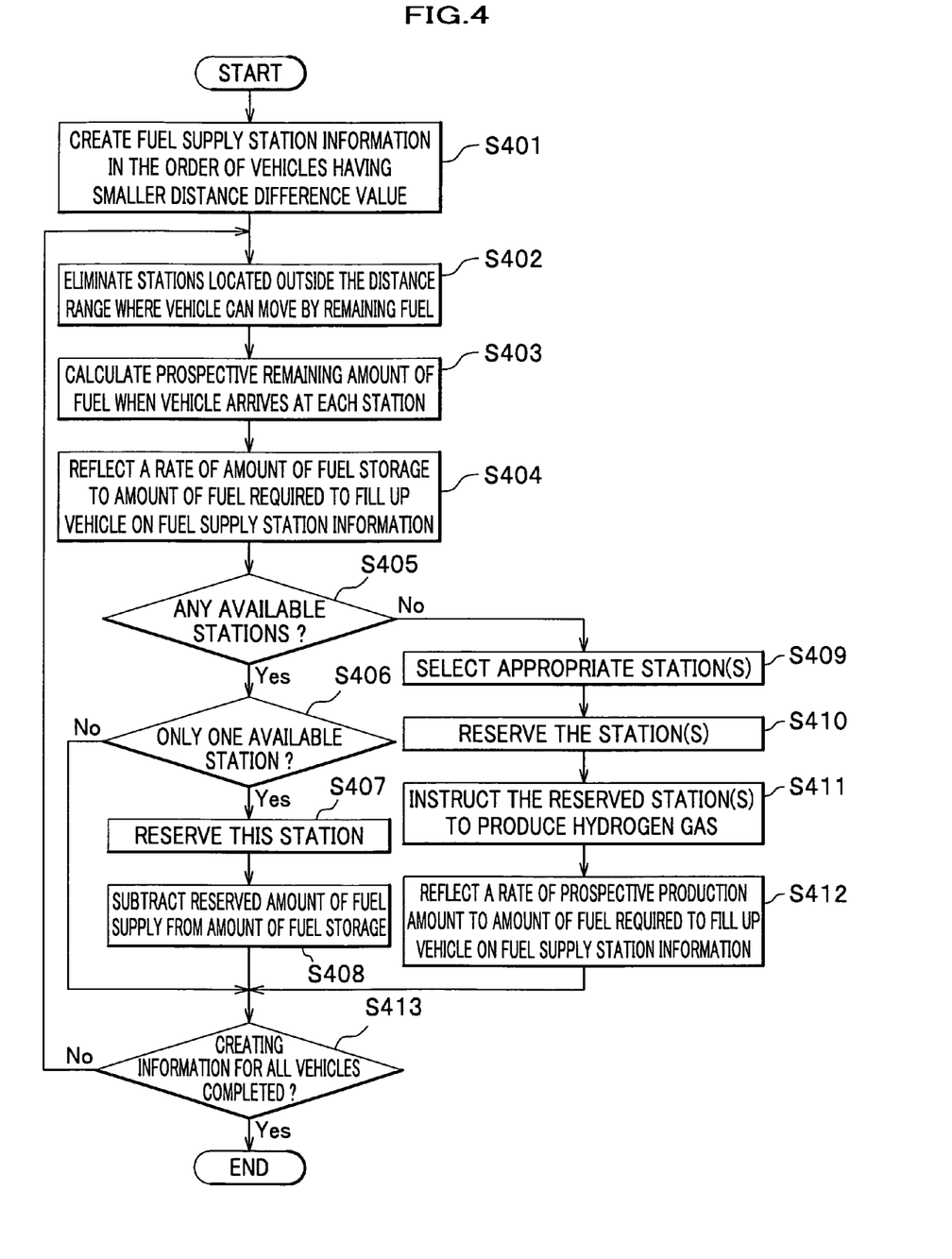
FIG. 4 is a flowchart showing a fuel supply station information creating process of the information distributing server.

As shown in FIGS. 3 and 4 and when necessary to FIGS. 1 and 2, processes in the fuel supply station information distributing system 10 will be described. Description will mainly be given to the processes of the information distributing server 3 instead of explaining about the fuel supply station information distributing system 10. As shown in FIG. 3, by executing the main processes at a predetermined time interval, the information distributing server 3 realizes the fuel supply station information distributing system 10 for informing the vehicles 1 about the fuel supply capacity of each station 2. Although the following description states as if the information distributing server 3 executes the processes, the main controller 31 actually executes the processes. Therefore, the main controller 31 executes a communication with the vehicles 1 and the stations 2 through the communication device 32. When an access is made to the vehicle information data base 331 and the station information data base 332, the main controller 31 executes an input-output operation (data read out and writing of data) relative to the storage device 33.

At first, the information distributing server 3 transmits a request-to-send (message) for the vehicle information to the area (geographical range) where the information distributing server 3 cognizes (step S301). The area is a geographical range, for example, surrounded by a circle with a radius having a predetermined distance, and the message of the request-to-send for the vehicle information is transmitted as an electric wave which can reach over the geographical range. The information distributing server 3 receives the vehicle information from the vehicle 1 which has received the message (step S302). The information distributing server 3 then updates the vehicle information data base 331 based on the vehicle information thus received (step S303) Updating is carried outbased on the vehicle ID included in the vehicle information.

Next, the information distributing server 3 transmits a request-to-send (message) for the station information in the cognizant area (step S304). The area is a geographical range, for example, surrounded by a circle with a radius having a predetermined distance. Therefore, in the case where the communication line network 5 is established by a wireless network, the message of the request-to-send for the station information is transmitted as an electric wave which can reach over the geographical range. In the case where the communication line network 5 is established by a wired network, the network addresses (IP (Internet Protocol) addresses) of the stations 2 located within the cognizant area are searched in advance, and the message is multicast to these network addresses. The information distributing server 3 receives the station information from the station 2 which has received the message (step S305). The information distributing server 3 then updates the station information data base 332 based on the station information thus received (step S306). Updating is carried out based on the station ID included in the station information.

By the above processes, the latest vehicle information is stored in the vehicle information data base 331 and the latest station information is stored in the station information data base 332 respectively within the cognizant area.

Next, the information distributing server 3 checks if any vehicles 1 reserve the station 2 (step S307). To be more specific, the information distributing server 3 searches the station information data base 332 and confirms whether or not the station information includes reservation situations on which are set vehicle IDs of other vehicles 1. If there is any reservation for the station 2 (step S307; Yes), then the reserved amount of fuel supply is subtracted from the amount of fuel storage at the reserved station 2 (step S308). To be more specific, the station information in the station information data base 332 is set again such that the reserved amount of fuel supply is subtracted from the present amount of fuel storage and the resulting amount is set as the effective storage amount (the amount of fuel storage reflecting the reservation situations). If there is no reservation for the station 2 (step S307; No), the process in step S308 is skipped.

Next, with respect to the remaining vehicles 1 which have not reserved a station 2, the information distributing server 3 calculates a priority of urgency for fuel supply (hereinafter simply referred to as urgency) (step S309). To be more specific, the following process is executed in order to calculate a distance difference value as an index for indicating the urgency. At first, the information distributing server 3 reads out the remaining amount of fuel of the vehicle 1, the geographic features and the traffic jam situations from the vehicle information data base 331, calculates a fuel consumption of the vehicle 1 based on the geographic features and the traffic jam situations, and calculates a prospective possible travel distance of the vehicle 1 based on the obtained fuel consumption and the remaining amount of fuel. The information distributing server 3 then reads out the current geographical position of the vehicle 1 from the vehicle information data base 331, and reads out the geographical positions of the stations 2 from the station information data base 332, and then calculates a distance between the vehicle 1 and the nearest station 2 as a minimum distance for the station 2 (station distance). The information distributing server 3 then subtracts the minimum distance for the station 2 from the prospective possible travel distance to obtain the distance difference value of the vehicle 1, and stores the distance difference value in the vehicle information-data base 331 of the storage device 33. It is not necessary to use a distance between the vehicle 1 and the nearest station 2, and a distance between the vehicle 1 and another station 2 may be used in consideration of the traveling direction of the vehicle 1.

The information distributing server 3 creates information (fuel supply station information) about stations 2 which can offer fuel to the vehicle 1 in the order of priority from urgent vehicles 1 (step S310). The fuel supply station information is created for each vehicle 1 and stored in the storage device 33 for the respective vehicles 1. In this embodiment, the priority from urgent vehicles 1 can be determined from the distance difference value calculated in step S309 such that the smaller the distance difference value, the higher the priority. This means that the vehicle 1 has less remaining amount of fuel to move to the nearest station 2 as the distance difference value is smaller. Process for creating the fuel supply station information will be described later.

The information distributing server 3 then distributes the fuel supply station information stored in the storage device 33 to each vehicle 1 (step S311).

The communication device 12 of the vehicle 1 receives the fuel supply station information that is distributed from the information distributing server 3, and ECU 11 causes the display device 14 (fuel supply station information displaying device) to display the received fuel supply station information. The display device 14 may display the prospective possible travel distance by the remaining amount of fuel. For the vehicles 1 of which priority of emergency is higher than a reference, the display device 14 may light on the warning lamp provided at the fuel indicator in the meter panel. The wording "priority of emergency is higher than a reference" means, for example, that the distance difference value calculated in step S309 is smaller than or not more than a predetermined threshold value as the reference. Manner of displaying the fuel supply station information will be described in detail with reference to an application example to be described later.

Therefore, the driver or passengers of the vehicle 1 can recognize the stations 2 which can offer supply of hydrogen gas, and if a plurality of stations 2 are displayed on the display device 14 such as a car navigation screen with their geographical position and amount of fuel that can be supplied to the vehicle 1, an appropriate station 2 can be selected, for example, in accordance with the traveling direction and/or the destination. In one embodiment, when the driver of the vehicle 1 selects a station 2 displayed on the display device 14, the car navigation system mounted on the vehicle 1 may guide the vehicle to the selected station 2. In another embodiment, if the selected station 2 does not stock a sufficient amount of fuel, the vehicle 1 may instruct the station 2 to produce hydrogen gas.

FIG. 4 is a flow chart showing a fuel supply station information creating process of the information distributing server. FIG. 4 explains details of the process in step S310 as shown in FIG. 3. In the fuel supply station information creating process, the information distributing server 3 calculates for each vehicle 1 a storage amount rate of fuel that is a rate of the amount of fuel storage at the station 2 to the amount of fuel required to fill up the vehicle 1, and creates information to be displayed on the display device 14 of the vehicle 1. The fuel supply station information previously includes a map data for the cognizant area.

The information distributing server 3 initiates a process to create the fuel supply station information in the order of priority from urgent vehicles 1, that is vehicles 1 having smaller distance difference value (step S401). At first, in accordance with the order of priority from urgent vehicles 1, the information distributing server 3 specifies the vehicle 1 to which is supplied fuel firstly, and eliminates the stations 2 which locate outside the distance range where the vehicle 1 can move by the remaining amount of fuel (step S402). To be more specific, the information distributing server 3 specifies the distance range where the vehicle 1 can move based on the current geographical position of the vehicle 1 that is read out from the vehicle information data base 331 and the prospective possible travel distance of the vehicle 1 that is calculated in the previous step. The information distributing server then eliminates from the fuel supply station information of the vehicle 1 the stations 2 which locate outside the distance range (does not display these stations 2 on the display device 14 of the vehicle 1) so as not to allow the driver of the vehicle 1 to select these stations 2. These stations 2 are excluded in the following processes. This is because the vehicle may not reach these stations 2 regardless of the amount of fuel storage at these stations 2.

Subsequently, the information distributing server 3 calculates a prospective remaining amount of fuel when the vehicle 1 arrives at each station 2 located in the distance range where the vehicle 1 can move by the remaining amount of fuel (step S403). To be more specific, the information distributing server 3 calculates a prospective fuel consumption amount based on the fuel consumption calculated in step S309 of FIG. 3 and the distance between the vehicle 1 and the station 2, and subtracts the prospective fuel consumption amount from the present remaining amount of fuel of the vehicle 1 to obtain the prospective remaining amount of fuel when the vehicle 1 arrives at the station 2. The information distributing server 3 reflects on the fuel supply station information of each station 2 the storage amount rate of fuel that is a rate of the amount of fuel storage at each station 2 to the amount of fuel required to fill up the vehicle 1 (step S404). The amount of fuel required to fill up the vehicle 1 can be obtained by subtracting the prospective remaining amount of fuel calculated in step S403 from the volume of the fuel storage tank that is the fill-up amount of fuel.

Next, the information distributing server 3 checks if there are any stations 2 that can offer fuel to the vehicle 1 (step S405). This can be made by checking whether the storage amount rate is greater than 0%. If there are some stations 2 that can offer fuel to the vehicle 1 (step S405; Yes), the information distributing server 3 checks if only one station 2 can supply fuel to the vehicle 1 (step S406). If only one station 2 can supply fuel to the vehicle 1 (step S406; Yes), the information distributing server 3 reserves this station 2 for the vehicle 1 with the amount of fuel required to fill up the vehicle 1 that is to be a reserved amount of fuel supply (step S407), because the vehicle 1 can not select any other stations 2. The information distributing server 3 then subtract the reserved amount of fuel supply from the amount of fuel storage at the station 2 (step S408). To be more specific, the amount of fuel required to fill up the vehicle 1 (reserved amount of fuel supply) is subtracted from the present amount of fuel storage at the station 2, and the resulting amount is set as the effective storage amount (the amount of fuel storage reflecting the reservation situations). If the number of stations 2 that can offer fuel to the vehicle 1 is not one (step S406; No), two or more stations 2 are available and the processes in step S407 and step S408 are skipped. If the number of stations 2 that can offer fuel to the vehicle 1 is not more than or less than a predetermined number, the information distributing server 3 may reserve all the stations 2 or some of these stations 2.

If any available stations 2 are not found by the check in step S405 (step S405; No), the information distributing server 3 selects one or more appropriate stations 2 from all the stations 2 located within the distance range where the vehicle 1 can move by the remaining amount of fuel (step S409). The appropriate stations 2 may be the nearest station 2 or other convenient stations 2 in consideration of the traveling direction of the vehicle 1. The information distributing server 3 then reserves the selected station(s) 2 with the amount of fuel required to fill up the vehicle 1 (reserved amount of fuel supply).

Subsequently, the information distributing server 3 instructs the reserved station(s) 2 to produce hydrogen gas (step S411). To be more specific, the information distributing server 3 sends a message for producing hydrogen gas to the station(s) 2. When the station 2 receives the message, the station 2 causes a hydrogen gas production device to produce hydrogen gas in accordance with the message. Further, the information distributing server 3 reflects for each station 2 a rate of the prospective production amount at the station 2 to the amount of fuel required to fill up the vehicle 1 on the fuel supply station information (step S412). The prospective production amount is obtained by multiplying the productive capacity of the station 2 that is read out from the station information data base 332 by the time required for arrival. In other words, the prospective production amount is the amount of hydrogen gas that is possibly produced at the station 2 from the present time to the arrival time (the time when the vehicle 1 arrives at the station 2). The arrival time may be obtained based on the distance between the vehicle 1 and the station 2 and the traffic jam situations. By the above processes, the information distributing server 3 creates the fuel supply station information for one vehicle 1 and stores it in the storage device 33.

Finally, the information distributing server 3 checks whether creating the fuel supply station information for all the vehicles 1 has been completed (step S413). If all the fuel supply station information has not been created (step S413; No), operation returns to step S402 so as to continue the fuel supply station information creating process for the next vehicle 1. If all the fuel supply station information has been created (step S413; Yes), the information distributing server 3 then completes the fuel supply station information creating process.

Application Example

With reference to FIGS. 5 through 9, explanation will be given to an application example, to which the processes of the fuel supply station information distributing system as described above are applied. Particularly, the fuel supply station information creating process shown in FIG. 4 will be described in detail.

Figure 5:
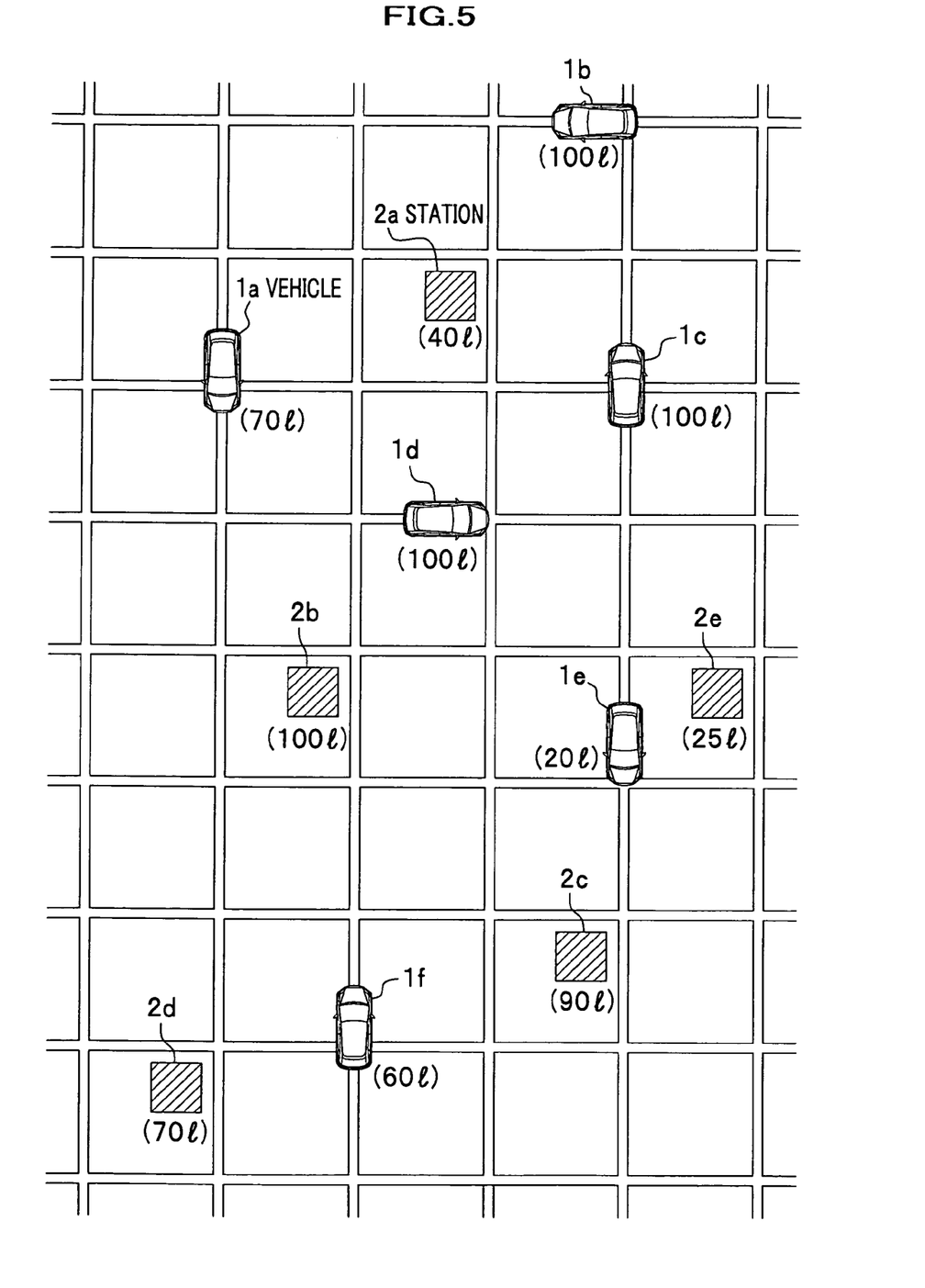
FIG. 5 shows geographical positional relations of vehicles and stations and the remaining amount of fuel of each vehicle.

As shown in FIG. 5, vehicles 1a-1f (six hydrogen vehicles) and stations 2a-2e (five hydrogen gas supply stations) are on the map. This map is prepared by showing the vehicle information (particularly, the current geographical position of each vehicle 1 and the remaining amount of fuel of each vehicle 1) and the station information (particularly, the geographical position of each station 2 and the amount of fuel storage at each station 2) on a map data, wherein the vehicle information was transmitted from the vehicle 1, received by the information distributing server 3 at given time and stored in the vehicle information data base 331, and the station information was transmitted from the station 2 and stored in the station information data base 332. The vehicle 1a has 70 liters of remaining fuel (remaining amount of fuel). The vehicle 1b has 100 liters of remaining fuel. The vehicle 1c has 100 liters of remaining fuel. The vehicle 1d has 100 liters of remaining fuel. The vehicle 1e has 20 liters of remaining fuel. The vehicle 1f has 60 liters of remaining fuel. Meanwhile, the station 2a stocks 40 liters of hydrogen gas (amount of fuel storage) The station 2b stocks 100 liters of hydrogen gas. The station 2c stocks 90 liters of hydrogen gas. The station 2d stocks 70 liters of hydrogen gas. The station 2e stocks 25 liters of hydrogen gas. It is supposed that each of the vehicles 1a-1f has a 100 liter fuel storage tank and 100 liters of fuel can be filled up in the tank.

Figure 6:
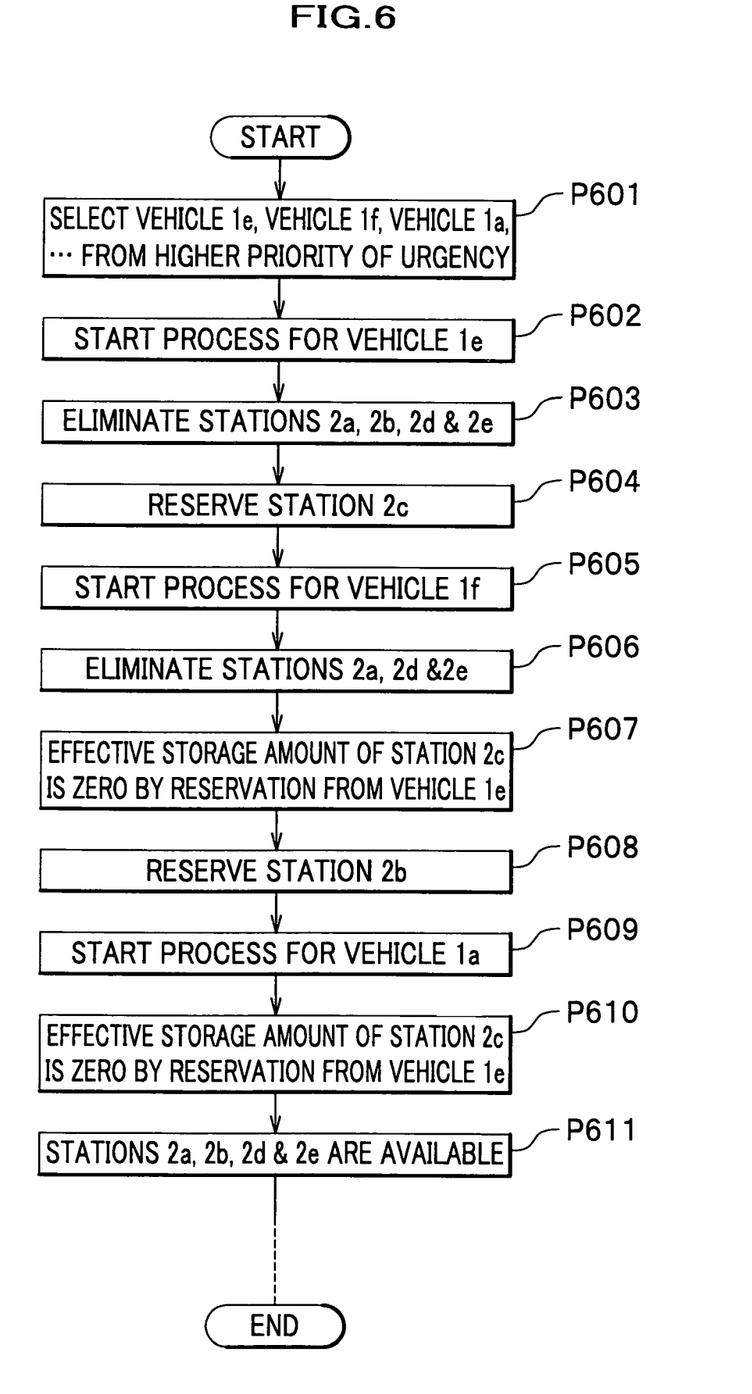
FIG. 6 shows an example in which the information distributing server creates fuel supply station information.

With reference to FIGS. 5 and 6 and when necessary to FIGS. 1, 2 and 4, the application example will be described below. The flow chart of FIG. 6 includes a handling process for handling predetermined processes and a recognition process for verifying and determining facts.

FIG. 6 shows an example in which the information distributing server 3 creates the fuel supply station information. At first, the information distributing server 3 determines the order of priority from urgent vehicles 1, and in the instance shown in FIG. 5, the vehicle 1e, the vehicle 1f, the vehicle 1a . . . are selected according to higher priority of urgency (process P601). In the step S401 of FIG. 4, the information distributing server 3 creates the fuel supply station information in the order of higher priority vehicles 1, in which the smaller the distance difference value obtained by subtracting the minimum distance for the station 2 (distance between the vehicle 1 and the nearest station 2) from the prospective possible travel distance of the vehicle 1, the higher the priority of urgency. However, in this application example, the order of priority is determined by not only considering the nearest stations 2 but also considering stations 2 located in the traveling direction of the vehicle 1.

Next, the information distributing server 3 starts the fuel supply station information creating process for the vehicle 1e (process P602). In the step S402 of FIG. 4, the information distributing server 3 eliminates the stations 2 located outside the distance range, and these stations 2 are determined in consideration of the prospective possible travel distance. However, in this application example, the information distributing server 3 eliminates the stations 2a, 2b, 2d and 2e in consideration of the prospective possible travel distance of the vehicle 1e and the traveling direction of the vehicle 1e. As the result, only one station 2c can supply fuel to the vehicle 1e. Therefore, the information distributing server 3 reserves the station 2c (process P604).

Figure 7:
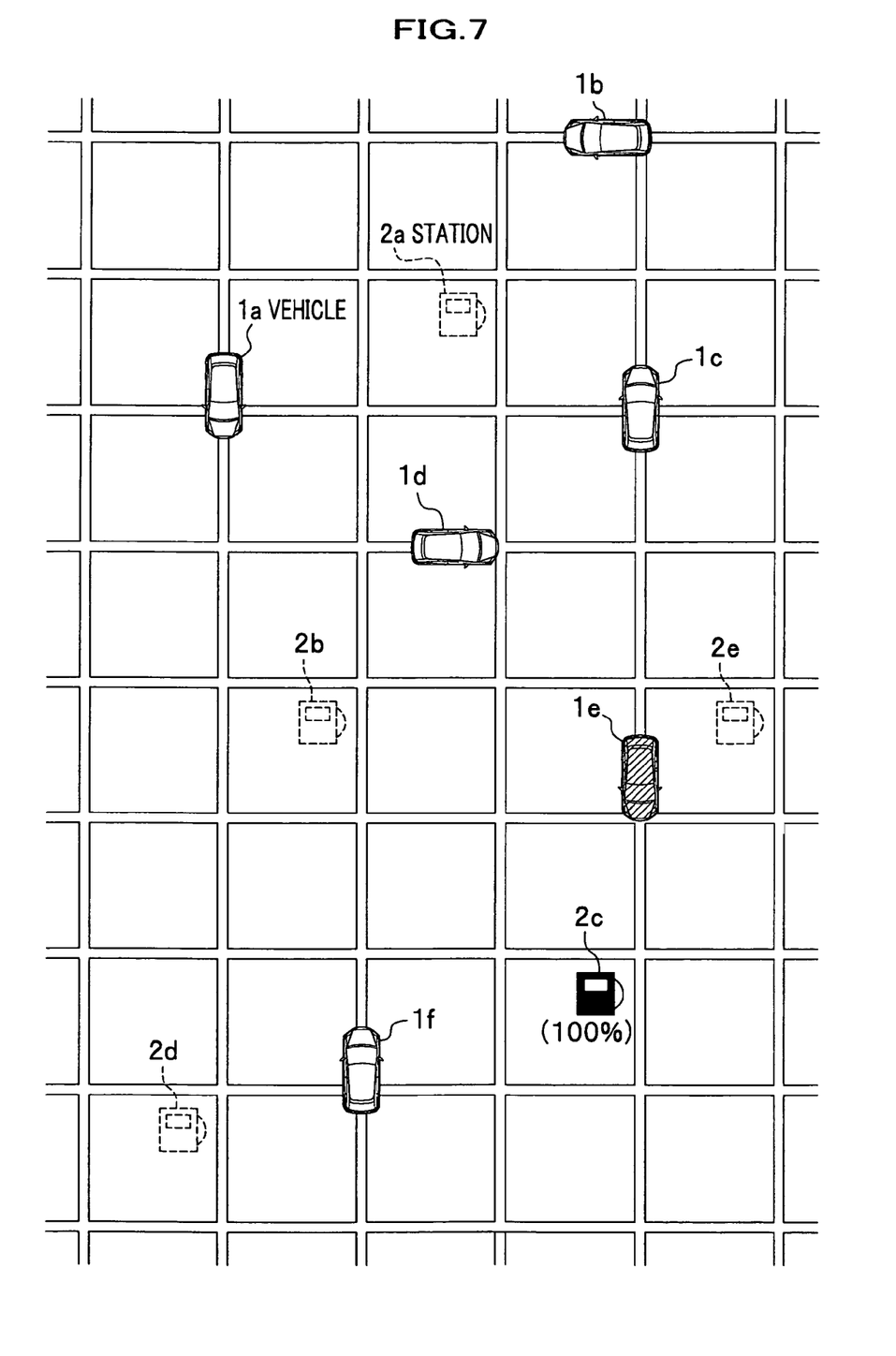
FIG. 7 shows an example in which the fuel supply station information is displayed on a display device of the vehicle.
Figure 8:
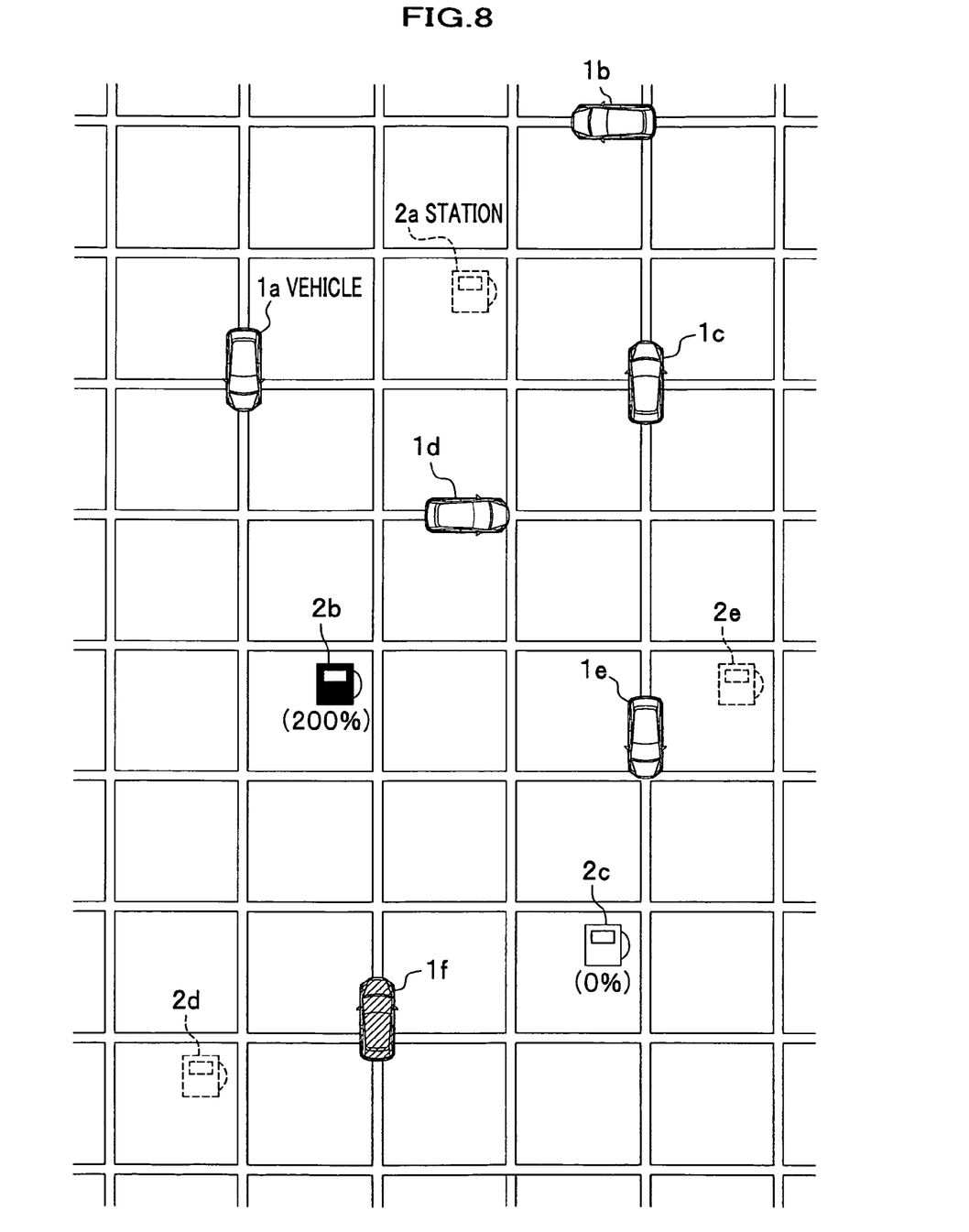
FIG. 8 shows an example in which the fuel supply station information is displayed on the display device of the vehicle.
Figure 9:
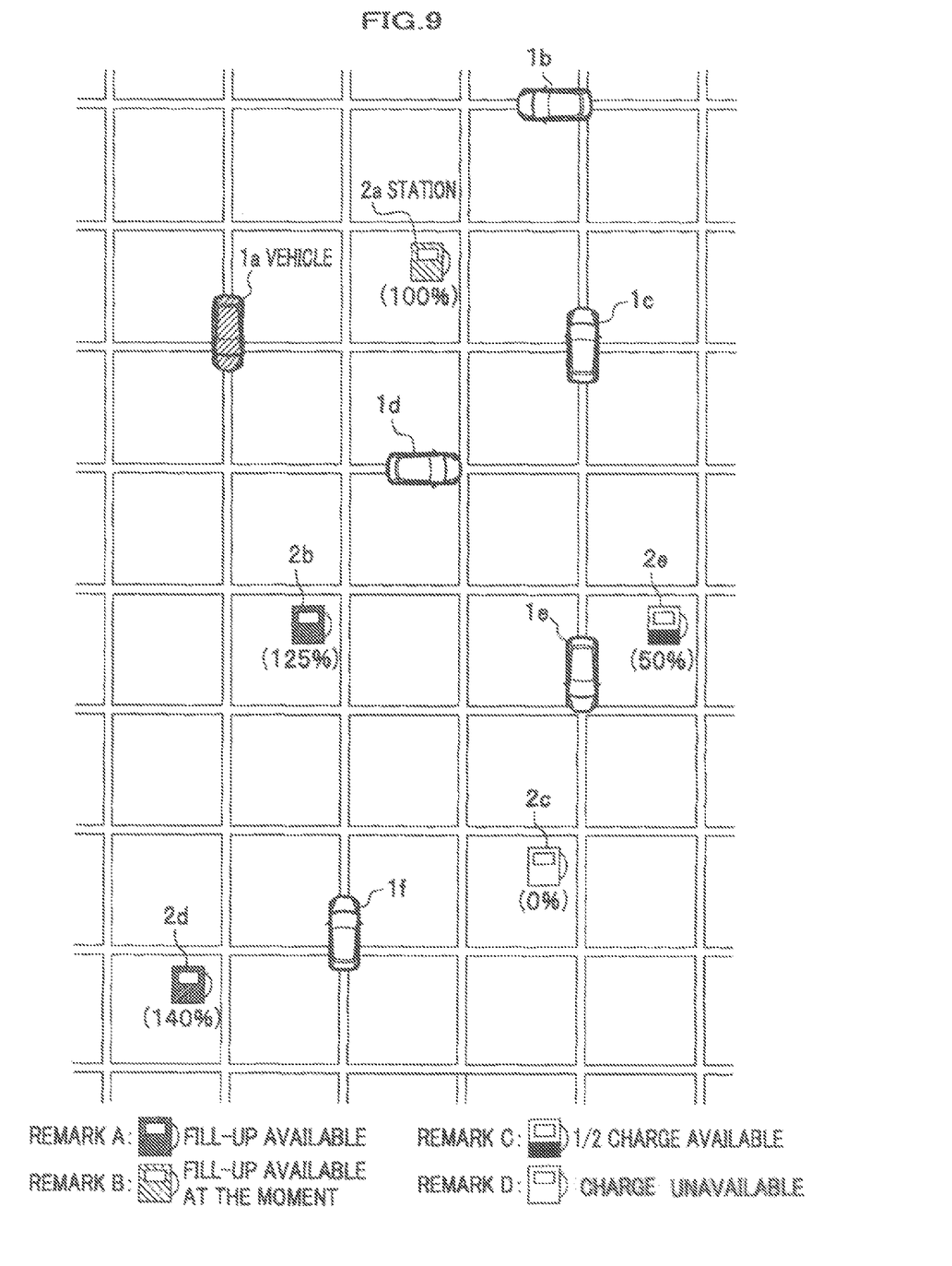
FIG. 9 shows another example in which the fuel supply station information is displayed on the display device of the vehicle.

In this instance, supposing that the vehicle 1e has 20 liters of remaining fuel at the moment and the remaining amount of fuel upon arrival at the station 2c is 10 liters, the amount of fuel required to fill up the vehicle 1e is 90 liters (=100 liters–10 liters). Therefore, the rate (storage amount rate) of the amount of fuel storage at the station 2c to the amount of fuel required to fill up the vehicle 1e is 100% (=90 liters/90 liters× 100). The information distributing server 3 creates the fuel supply station information for causing the display device 14 of the vehicle 1e to perform the information display such as illustrated in FIG. 7. FIG. 7 is created by arranging the icon (display data) of the station 2 on the map data. FIGS. 8 and 9 are also created as with the information display of FIG. 7. In FIG. 7, hatching is applied to the own vehicle, that is the vehicle 1e. An indication is made on the station 2c so that the storage amount rate is equal to or more than 100%. The indication of "100%" is used for convenience of explanation, and this may be omitted from the display shown in FIG. 7. This can also be said to FIGS. 8 and 9. The stations 2a, 2b, 2d and 2e which have been eliminated in process P603 are indicated by dotted line. This means that even if these stations 2a, 2b, 2d and 2e are left out of the selection, they actually exist on the map. Of course, these stations may not be displayed on the map. This can also be said to FIG. 8. The effective storage amount at the station 2c becomes 0 liters (=90 liters–90 liters), and this value is reflected on the station information for the station 2c that is stored in the station information data base 332 of the storage device 33.

Next, the information distributing server 3 starts the fuel supply station information creating process for the vehicle 1f (process P605). The information distributing server 3 eliminates the stations 2a, 2d and 2e in consideration of the prospective possible travel distance and the traveling direction (process P606) Of the remaining stations 2b and 2c, the station 2c has no effective storage amount (0 liter) by the reservation from the vehicle 1e (process P607). As the result, only the station 2b can offer fuel to the vehicle 1f, the information distributing server 3 reserves the station 2b (process P608).

In this instance, supposing that the vehicle if has 60 liters of remaining fuel at the moment and the remaining amount of fuel upon arrival at the station 2b is 50 liters, the amount of fuel required to fill up the vehicle if is 50 liters (=100 liters–50 liters). Therefore, the rate (storage amount rate) of the amount of fuel storage at the station 2b to the amount of fuel required to fill up the vehicle 1e is 200% (=100 liters/50 liters×100). The information distributing server 3 creates the fuel supply station information for causing the display device 14 of the vehicle if to perform the information display such as illustrated in FIG. 8. In FIG. 8, hatching is applied to the own vehicle, that is the vehicle 1f. An indication is made on the station 2b so that the storage amount rate is equal to or more than 100%. Since the effective storage amount at the station 2c is 0 liter, an indication is made on the station 2c so that the storage amount rate is 0%. The stations 2a, 2d and 2e which have been eliminated in process P606 are indicated by dotted line. The effective storage amount at the station 2b becomes 50 liters (=100 liters–50 liters) and this value is reflected on the station information for the station 2b that is stored in the station information data base 332 of the storage device 33.

Further, the information distributing server 3 starts the fuel supply station information creating process for the vehicle 1a (process P609). Taking into consideration the prospective possible travel distance and the traveling direction of the vehicle 1a, the information distributing server 3 does not eliminate any stations 3. However, of the stations 2a-2e, the effective storage amount at the station 2c is 0 liter (process P610) because of the reservation from the vehicle 1e (process P604). The information distributing server 3 then choose the stations 2a, 2b, 2d and 2e as available stations.

In this instance, supposing that the vehicle 1a has 70 liters of remaining fuel at the moment and the remaining amount of fuel upon arrival at the station 2a is 60 liters, the amount of fuel required to fill up the vehicle 1a is 40 liters (=100 liters–60 liters). Therefore, the rate (storage amount rate) of the amount of fuel storage at the station 2a to the amount of fuel required to fill up the vehicle 1a is 100% (=40 liters/40 liters× 100). Next, supposing that the remaining amount of fuel becomes 60 liters when the vehicle 1a arrives at the station 2b, the amount of fuel required to fill up the vehicle 1a is 40 liters (=100 liters–60 liters). Therefore, the rate (storage amount rate) of the effective amount of fuel storage at the station 2b to the amount of fuel required to fill up the vehicle 1a is 125% (=50 liters/40 liters×100). Subsequently, supposing that the remaining amount of fuel becomes 50 liters when the vehicle 1a arrives at the station 2d, the amount of fuel required to fill up the vehicle 1a is 50 liters (=100 liters–50 liters). Therefore, the rate (storage amount rate) of the amount of fuel storage at the station 2d to the amount of fuel required to fill up the vehicle 1a is 140% (=70 liters/50 liters×100). Further, supposing that the remaining amount of fuel becomes 50 liters when the vehicle 1a arrives at the station 2e, the amount of fuel required to fill up the vehicle 1a is 50 liters (=100 liters-50 liters). Therefore, the rate (storage amount rate) of the amount of fuel storage at the station 2e to the amount of fuel required to fill up the vehicle 1a is 50% (=25 liters/50 liters× 100).

In this instance, the information distributing server 3 creates the fuel supply station information for causing the display device 14 of the vehicle 1f to perform the information display such as illustrated in FIG. 9. Hatching is applied to the own vehicle, that is the vehicle 1a. FIG. 9 is different in information display from FIGS. 7 and 8. FIG. 9 shows storage amount rate by an image classified in accordance with the range thereof, instead of merely reflecting and displaying the storage amount rate.

For example, the station 2a is shown by Remark B representing "fill-up available at the moment", which means that the station 2a can afford to supply fuel if the vehicle 1 goes to the station 2a soon. To be more specific, Remark B represents the storage amount rate in the range from 80% (not less than 80%) to 120% (less than 120%). The stations 2b and 2d are shown by Remark A representing "fill-up available". To be more specific, Remark A represents the storage amount rate in the range over 120% (not less than 120%). Further, the station 2c is shown by Remark D representing "charge unavailable". To be more specific, Remark D represents the storage amount rate in the range smaller than 10%. The station 2e is shown by Remark C representing "½ charge available". To be more specific, Remark C represents the storage amount rate in the range from 40% (not less than 40%) to 60% (less than 60%). In the above explanation, there are no associated remarks for the range from 10% (not less than 10%) to 40% (less than 40%) and the range from 60% (not less than 60%) to 80% (less than 80%). However, if necessary, other remarks may be provided for these ranges. Explanation for the processes for the vehicles 1b, 1c and 1d will be omitted.

Instead of icon displays such as Remarks A-D, it is possible to distinguish the storage amount rate in accordance with color of the icon, change of the color tone, flashing indication or the like. Further, instead of displaying on the car navigation screen, the storage amount rate may be indicated on the meter panel. In this instance, the information including the amount of fuel that can be supplied to the vehicle 1 at the station 2 and the address of the station 2 may be displayed in a format of a table with or without the storage amount rate. Because the fuel supply station information is displayed on the meter panel that is positioned in front of the driver seat, the driver can readily look at and select appropriate stations 2.

As described above, the information distributing server 3 informs vehicles 1 within the cognizant area about the fuel supply capacity for each station 2 using the vehicle information and the station information. Therefore, even if a fuel supply environment is insufficient in that the number of stations 2 and scale of these stations 2 are small, the driver can drive the vehicle 1 without worry about lack of fuel. Further, because the information distributing server 3 receives the station information within the cognizant area at every given time, it is possible to receive information about a newly built station 2 and reflects it on the fuel supply station information.

Further, because the information distributing server 3 receives vehicle information from a plurality of vehicles 1, it is possible to provide effective information by means of creating information in the order from higher priority vehicles 1. Because the information distributing server 3 receives station information from a plurality of stations 2, it is possible to select an appropriate station 2 such as one in the traveling direction or one close to the traveling direction of the vehicle 1.

Other Embodiments

While the present invention has been described with reference to preferred embodiments thereof, it is to be understood that various changes and modifications may be made without departing from the spirit of the invention. For example, the following embodiments are available.

(1) In the above embodiment, the information distributing server 3 transmits the request-to-send for the vehicle information and the request-to-send for the station information within the cognizant area, and receives in response the vehicle information and the station information. However, the vehicle 1 or the station 2 may transmit the vehicle information or the station information to the predetermined area at every given time. In this embodiment, the driver of the vehicle 1 can receive service for accepting the fuel supply station information from a plurality of information distributing servers 3 located within a given area. Further, it is possible to decrease the amount of data communication on the communication line networks 4 and 5.

(2) In the above embodiment, the information distributing server 3 distributes the fuel supply station information at every given time to the vehicles 1 running within the cognizant area. However, the vehicle 1 may transmit a request for the fuel supply station information to the information distributing server 3, and in response the information distributing server 3 may send back the fuel supply station information. In this embodiment, when the driver of the vehicle 1 recognizes the necessity for supply of fuel, the driver can obtain the fuel supply station information at any time.

(3) In the above embodiment, hydrogen gas is used as fuel. However, other fuel such as gasoline, light oil and natural gas may be used.

(4) In the above embodiment, vehicle is used as an example of movable member. However, other movable members such as ships and vessels and airplanes may be employed.

What is claimed is:
1. A fuel supply station information distributing system comprising:
at least one movable member side device, each mounted on a movable member, keeping movable member information that is information about the movable member, and updating the movable member information as needed;
at least one fuel supply station side device, each installed in a fuel supply station for supplying movable members with fuel, keeping station information that is information about the fuel supply station, and updating the station information as needed; and
a fuel supply station information distributing server connected to the movable member side devices and the fuel supply station side devices through a network, creating fuel supply station information associated with each of the movable members based on the movable member information received from one movable member side device and the station information received from the fuel supply station side devices, and distributing the fuel supply station information thus created to the one movable member side device,
wherein the movable member information includes a remaining amount of fuel of the movable member and a geographical position of the movable member, and the station information includes an amount of fuel storage at the fuel supply station and a geographical position of the fuel supply station,
wherein the fuel supply station information distributing server calculates for each movable member a prospective remaining amount of fuel when the movable member arrives at the fuel supply station, based on information including the remaining amount of fuel of the movable member, the geographical position of the movable member and the geographical position of the fuel supply station creates the fuel supply station information about an amount of fuel that can be supplied at the fuel supply station to the movable member in consideration of the amount of fuel storage at the fuel supply station and the prospective remaining amount of fuel when the movable member arrives at the fuel supply station, and distributes the fuel supply station information thus created to the movable member side device, and
wherein the movable member side device is connected to a display device for displaying predetermined information, and causes the display device to display the fuel supply station information upon receiving the fuel supply station information from the fuel supply station information distributing server.

2. A fuel supply station information distributing server which is connected to at least one movable member side device and at least one fuel supply station side device through a network creates fuel supply station information associated with each of the movable members based on movable member information received from one movable member side device and station information received from the fuel supply station side devices, and distributes the fuel supply station information thus created to the one movable member side device,
wherein each of the movable member side devices is mounted on a movable member, keeps the movable member information that is information about the movable member, and updates the movable member information as needed; and the movable member information includes a remaining amount of fuel of the movable member and a geographical position of the movable member, wherein each of the fuel supply station side devices is installed in a fuel supply station for supplying movable members with fuel, keeps the station information that is information about the fuel supply station, and updates the station information as needed; and the station information includes an amount of fuel storage at the fuel supply station and a geographical position of the fuel supply station, and wherein the fuel supply station information distributing server calculates for each movable member a prospective remaining amount of fuel when the movable member arrives at the fuel supply station, based on information including the remaining amount of fuel of the movable member, the geographical position of the movable member and the geographical position of the fuel supply station, creates the fuel supply station information about an amount of fuel that can be supplied at the fuel supply station to the movable member in consideration of the amount of fuel storage at the fuel supply station and the prospective remaining amount of fuel when the movable member arrives at the fuel supply station, and distributes the fuel supply station information thus created to the movable member side device.

3. A fuel supply station information distributing server according to claim 2, wherein the fuel supply station information distributing server calculates for each of the movable members a prospective possible travel distance for which the movable member can move based on the information including the remaining amount of fuel of the movable member, calculates a station distance that is a distance from the movable member to an appropriate fuel supply station based on the geographical position of the movable member and the geographical position of the fuel supply station, creates the fuel supply station information in order of movable members having smaller distance difference value that is a value obtained by subtracting the station distance from the prospective possible travel distance of the movable member, reserves one or more fuel supply stations for supplying fuel to the movable member if the number of fuel supply stations that can offer fuel to the movable member is smaller than a predetermined number, and subtracts an amount of fuel to be supplied to the movable member from the amount of fuel storage at the fuel supply station.

4. A fuel supply station information displaying device connected to the movable member side device included in the fuel supply station information distributing system of claim 1, wherein the fuel supply station information displaying device displays the fuel supply station information when the movable member side device receives the fuel supply station information from the fuel supply station information distributing server.

5. A fuel supply station information displaying device according to claim 4, wherein a storage amount rate of fuel that is a rate of the amount of fuel storage at each fuel supply station to an amount of fuel required to fill up the movable member is calculated as the fuel supply station information, and the fuel supply station information displaying device displays a display data indicating the calculated storage amount rate of fuel on a map data.

* * * * *